United States Patent
Kuntz et al.

(10) Patent No.: US 9,630,883 B2
(45) Date of Patent: *Apr. 25, 2017

(54) CERAMIC COMPOSITE MATERIAL CONSISTING OF ALUMINIUM OXIDE AND ZIRCONIUM OXIDE AS THE MAIN CONSTITUENTS, AND A DISPERSOID PHASE

(75) Inventors: Meinhard Kuntz, Esslingen (DE); Michael Kuntz, Homburg (DE); Lukas Gottwik, Heiningen (DE); Kristina Schlicher, Esslingen (DE); Andreas Morhardt, Esslingen (DE); Kilian Friederich, Plochingen (DE); Norbert Schneider, Schorndorf (DE)

(73) Assignee: CeramTec GmbH, Plochingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/515,413

(22) PCT Filed: Dec. 16, 2010

(86) PCT No.: PCT/EP2010/069995
§ 371 (c)(1),
(2), (4) Date: Jun. 12, 2012

(87) PCT Pub. No.: WO2011/083023
PCT Pub. Date: Jul. 14, 2011

(65) Prior Publication Data
US 2012/0252656 A1    Oct. 4, 2012

(30) Foreign Application Priority Data

Dec. 16, 2009  (DE) .................. 10 2009 054 798
Dec. 16, 2009  (DE) .................. 10 2009 054 799

(51) Int. Cl.
*C04B 35/119*    (2006.01)
*C04B 35/645*    (2006.01)

(52) U.S. Cl.
CPC .. *C04B 35/6455* (2013.01); *C04B 2235/3206* (2013.01); *C04B 2235/3208* (2013.01);
(Continued)

(58) Field of Classification Search
CPC ..................................................... C04B 35/119
(Continued)

(56) References Cited

U.S. PATENT DOCUMENTS 4,419,311 A * 12/1983 Claussen et al. ............. 264/681
4,771,022 A *  9/1988 Block et al. .................. 501/103
(Continued)

FOREIGN PATENT DOCUMENTS

EP         2 168 936 A1     3/2010
WO     WO 01/80783 A2     11/2001
(Continued)

OTHER PUBLICATIONS

Becher, Paul F. "Transient Thermal Stess Behavior In $ZrO_2$-Toughened $Al_2O_3$", *J. Am. Ceram. Soc.* 64, No. 1 (1981), pp. 37-39.
(Continued)

*Primary Examiner* — Karl Group
(74) *Attorney, Agent, or Firm* — Norton Rose Fulbright US LLP

(57) ABSTRACT

A composite material consisting of aluminium oxide as a ceramic matrix and zirconium oxide dispersed therein. A method for the production thereof, components containing the composite and methods of using the same are also provided.

13 Claims, 3 Drawing Sheets

(52) U.S. Cl.
CPC ............. *C04B 2235/3213* (2013.01); *C04B 2235/3222* (2013.01); *C04B 2235/3225* (2013.01); *C04B 2235/3227* (2013.01); *C04B 2235/3229* (2013.01); *C04B 2235/3246* (2013.01); *C04B 2235/5292* (2013.01); *C04B 2235/5436* (2013.01); *C04B 2235/5445* (2013.01); *C04B 2235/662* (2013.01); *C04B 2235/72* (2013.01); *C04B 2235/765* (2013.01); *C04B 2235/786* (2013.01); *C04B 2235/80* (2013.01); *C04B 2235/96* (2013.01)

(58) Field of Classification Search
USPC ........................................................ 501/105
See application file for complete search history.

(56) References Cited

U.S. PATENT DOCUMENTS

| | | | |
|---|---|---|---|
| 5,002,911 A * | 3/1991 | Matsumoto et al. | 501/105 |
| 5,032,555 A | 7/1991 | Yamanis et al. | |
| 5,082,809 A * | 1/1992 | Hayashi | 501/105 |
| 6,452,957 B1 * | 9/2002 | Burger et al. | 373/137 |
| 7,148,167 B2 * | 12/2006 | Shikata et al. | 501/105 |
| 7,820,577 B2 * | 10/2010 | Shikata et al. | 501/105 |
| 2002/0010070 A1 | 1/2002 | Cales et al. | |
| 2005/0049137 A1 * | 3/2005 | Shikata et al. | 501/105 |
| 2010/0120605 A1 | 5/2010 | Kuntz et al. | |
| 2010/0137972 A1 | 6/2010 | Kuntz et al. | |
| 2010/0152018 A1 * | 6/2010 | Kuntz et al. | 501/104 |

FOREIGN PATENT DOCUMENTS

| | | |
|---|---|---|
| WO | WO 2008/132157 A2 | 11/2008 |
| WO | WO 2008/132158 A1 | 11/2008 |
| WO | WO 2008/132159 A1 | 11/2008 |

OTHER PUBLICATIONS

Hannink, et al., "Transformation Toughening in Zirconia-Containing Ceramics", *J. Am, Ceram. Soc.* 83 [3], (2000), pp. 461-487.
In Kollenberg, W. Technische Keraminik, Grundlagen, Werkstoffe, Verfahrenstechnik; 2 Auflage; "Ceramic Materials", Vulkam Verlag, Essen, 2009; XP002629667; pp. 231-250 (with English translation).
Rahaman, et al. "Ceramics for Prosthetic Hip and Knee Joint Replacement" *J. Am. Ceram. Soc.* 90 [7], (2007), XP-0002630077, pp. 1965-1988.
De Aza, et al. "Slow-Crack-Growth Behavior of Zirconia-Toughened Alumina Ceramics Processed by Different Methods", *J. Am, Ceram. Soc.* 86 [1] (2003), pp. 115-120.

* cited by examiner

US 9,630,883 B2

CERAMIC COMPOSITE MATERIAL CONSISTING OF ALUMINIUM OXIDE AND ZIRCONIUM OXIDE AS THE MAIN CONSTITUENTS, AND A DISPERSOID PHASE

This application is a §371 of PCT/EP2010/069995, filed on Dec. 16, 2010, and claims priority from German Patent Application Nos. 102009054799.1 and 102009054798.3, each of which was filed on Dec. 16, 2009.

FIELD OF THE INVENTION

The present invention relates to a composite consisting of aluminum oxide as a ceramic matrix and zirconium oxide dispersed therein, a method for the production thereof, and the use of the same.

BACKGROUND OF THE INVENTION

The molecular structures of metallic and ceramic materials differ substantially from each other. In the metallic bond, the electrons orbit the atomic nuclei disorderly and with comparatively to bonding force. Ions, for example in the body environment, separate constantly from this "loose" structure; a variety of chemical reactions are possible.

In ceramic molecules, the electrons in the ceramic bond follow precisely predefined paths, the so-called directed electron orbitals. Their bonding force is very high; the molecules are extremely stable. Therefore, no formation of ions takes place and chemical reactions are virtually impossible.

The extremely stable ceramic bond almost excludes plastic deformation of the material. This effects, on the one hand, the desired extremely high hardness, but, on the other, it results in relatively high brittleness. However, with the correct material design, it is possible to achieve high hardness and high ductility at the same time.

Material science distinguishes between fracture strength and fracture toughness. Fracture strength is the maximum mechanical stress a material resists without breaking. Fracture toughness, or crack initiation toughness, describes the resistance of a material against the onset of crack propagation. Ceramic materials which have very high fracture strength are today already in use in medical technology. Some of these materials have in addition extremely high fracture toughness. Such materials have a much better resistance against the onset of cracks than other ceramics and can retard the growth of the crack.

This property is based on reinforcement mechanisms. The first reinforcement mechanism is owed to the embedded tetragonal zirconium oxide nanoparticles. These particles are individually distributed in the aluminum oxide matrix. They generate local pressure peaks in the region of the cracks and counteract crack propagation in this manner.

The second reinforcement mechanism is achieved through platelet-shaped crystals which likewise form sporadically in the oxide mixture. These "platelets" deflect potential cracks, disperse crack energy and thus dissipate energy. Both functions with such materials also allow constructing component geometries which were not achievable in the past with ceramics.

OBJECTS AND SUMMARY OF THE INVENTION

The object underlying the present invention was to further improve the properties of the known ceramic materials.

The present invention relates to a ceramic composite material consisting of the main constituents, aluminum oxide and zirconium oxide, as well as one or a plurality of inorganic aggregates by means of which the properties of the composite material can be influenced. Here, aluminum oxide forms the main component with a volume content of >65%, preferably 85 to 90%; zirconium oxide forms the secondary component with a volume content between 10 and 35%. Further additives, in the following referred to as dispersoids, can account for a volume content of 1 to 10%, preferably 2 to 8%, particularly preferred 3.5 to 7%. Furthermore, aluminum oxide as well as zirconium oxide can also contain soluble constituents. As soluble constituents, one or a plurality of the following elements can be present: Cr, Fe, Mg, Ti, Y, Ce, Ca, lanthanides and/or V. In the initial state, zirconium oxide is present in a large proportion, preferably 80 to 99%, particularly preferred 90 to 99% based on the total zirconium content, in the tetragonal phase. The known phase transformation of zirconium oxide from tetragonal to monoclinic is utilized in the composite material according to the invention as a reinforcement mechanism in order to favorably influence fracture toughness and strength.

DETAILED DESCRIPTION

Figure 1:
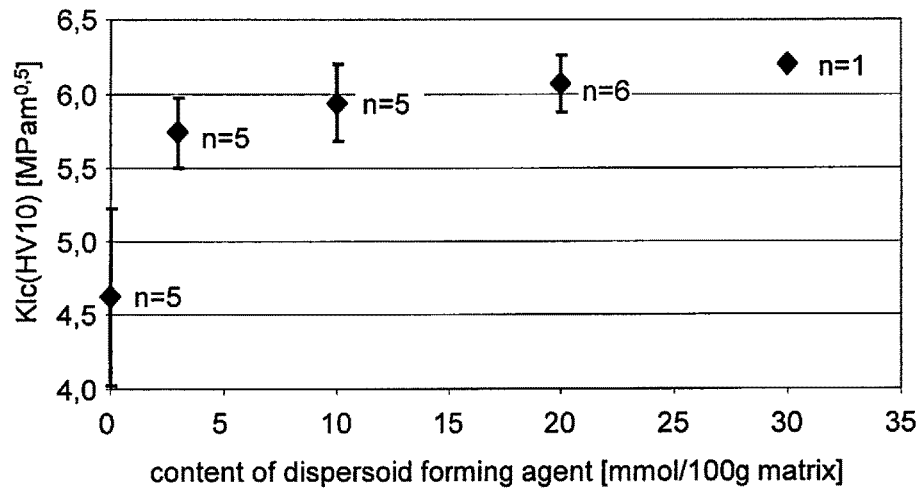
FIG. 1 is a graph of the content of dispersoid forming agent vs. Klc(HV10) [MPam$^{0.5}$].

Stabilizing the tetragonal phase of zirconium oxide in the composite material according to the invention surprisingly takes place for the most part not chemically but mechanically. Thus, the content of inorganic chemical stabilizers relative to zirconium oxide is limited to values which are considerably lower than the contents normally used in the prior art. $Y_2O_3$ is the chemical stabilizer which is usually and preferably used in the prior art. Further known stabilizers are $CeO_2$, CaO and MgO.

Examples of known formulations for ceramic composite materials are:

| Designation | Mol % $Y_2O_3$ based on $ZrO_2$ |
| --- | --- |
| Y-TZP[1] | 2.8 or 3.2 |
| ZTA[2] | 1.3 |

[1]Yttrium toughened Zirconia
[2]Zirconia toughened Alumina

In the composite material according to the invention, a stabilizer content is used which is considerably lower than the contents used in the prior art. This is possible according to the invention in that in the composite material according to the invention, the zirconium oxide is embedded into the aluminum oxide matrix in such a manner that by embedding into the matrix, said zirconium oxide is stabilized in the metastable tetragonal phase (mechanical stabilization).

A requirement for mechanical stabilization is an aluminum oxide proportion of at least 65% by volume, preferably 65 to 90% by volume, with a zirconium oxide proportion of 10 to 35% by volume. Of particular importance for the surprisingly achievable mechanical stabilization according to the invention is the grain size of the zirconium oxide particles in the composite material according to the invention. The grain size of the zirconium particles should on average not exceed 0.5 μm (measured according to the linear intercept method). Preferred for the composite material mechanically stabilized according to the invention are zirconium particles with a grain size on average from 0.1 μm to 0.2 μm, 0.2 μm to 0.3 μm, 0.3 μm to 0.4 μm, or 0.4 μm to 0.5 μm, preferred from 0.1 μm to 0.3 μm, particularly preferred from 0.15 μm to 0.25 μm.

The proportion of chemical stabilizers in the composite material according to the invention (proportion in each case relative to the zirconium content) is for $Y_2O_3 \leq 1.5$ mol %, preferred $\leq 1.3$ mol %, for $CeO_2 \leq 3$ mol %, for $MgO \leq 3$ mol % and for $CaO \leq 3$ mol %. Particularly preferred is a total stabilizer content of less than 0.2 mol %. Particularly preferred according to the invention is a mechanically stabilized composite material, that contains no chemical stabilizer.

It is known that materials which are stabilized by using chemical stabilizers, in particular materials stabilized by $Y_2O_3$, are prone to hydrothermal aging. In these materials, spontaneous phase transformation occurs in presence of water molecules at elevated temperatures, for example, already at body temperature. The reason for this sensitivity to water at elevated temperatures is the formation of oxygen vacancies in the zirconium oxide lattice, which vacancies then can be filled with hydroxide ions. This phenomenon is called "hydrothermal aging".

The composite material according to the invention is considerably less prone to hydrothermal aging than materials which are stabilized through the use of chemical stabilizers, in particular through the use of $Y_2O_3$.

Through the reduced content of chemical stabilizers, the zirconium oxide lattice in the composite material according to the invention contains proportionally less oxygen vacancies. Thus, the composite material according to the invention reacts less sensitive to the presence of water at elevated temperatures as is the case for materials known from the prior art: the composite material according to the invention is considerably less prone to hydrothermal aging.

In addition to the main constituents, aluminum oxide and zirconium oxide, the composite material according to the invention contains a third phase as a secondary component. This third phase is designated in the following as "dispersoid phase" and is formed according to the invention by components which are designated hereinafter as "dispersoids".

Dispersoids in the meaning of the present invention are platelets which enable inelastic micro-deformations. The dispersoid phase formed thereby surprisingly results in a significant increase of fracture toughness and strength, namely in that mechanical expansions on a microscopic level, thus inelastic micro-deformations within the dispersoid phase, are supported in the composite material. The particle sizes of the dispersoids provided according to the invention are significantly larger than the grain sizes of the aluminum oxide and zirconium oxide used according to the invention; they are preferably 1 to 5 μm. The volume proportion of the dispersoids forming the third phase is generally considerably smaller than the proportion of the zirconium oxide. The content can preferably be up to 10% by volume. Particularly preferred, the contents range from 2 to 8% by volume, and most preferably, the contents range from 3 to 6% by volume.

As dispersoids, all substances can principally be used according to the invention which are chemically stable and which during the production of the composite material by sintering at high temperatures do not dissolve in the aluminum oxide or in the zirconium oxide and, due to their crystal structure, enable inelastic micro-deformations on a microscopic level. According to the invention, the addition of dispersoids as well as in-situ formation of dispersoids during the production of the composite material according to the invention is also possible. Examples for dispersoids suitable according to the invention are strontium aluminate ($SrAl_{12}O_{19}$) or lanthanum aluminate ($LaAl_{12}O_{18}$).

The dispersoid phase has the function to accommodate inhomogeneous expansions of the main constituents, aluminum oxide and zirconium oxide, on a microscopic level. The term "inhomogeneous microscopic expansion" serves for differentiation from the macroscopic homogeneous expansion of the material, for example due to thermal expansion or due to mechanical stress applied from outside. Inhomogeneous microscopic expansion describes local events which take place on the dimensional level of the crystallites. This concerns in particular such expansions which are caused by appropriate load acting on the composite material according to the invention and the resulting initiation of the phase transformation of the zirconium oxide from the tetragonal phase into the monoclinic phase, which transformation is desired according to the invention. The phase transformation from tetragonal to monoclinic is associated with a volume increase of approximately 4% and is comprehensively described in literature, for example in D. J. Green, Transformation Toughening of Ceramics, CRC Press Florida, 1989, ISBN 0-8493-6594-5. Said transformation is triggered by high local tensile stress, for example in the vicinity of material detects, and effects an increase of fracture toughness of the material, the so-called transformation toughening. Due to the chase transformation of individual zirconium oxide crystals, the surrounding area of the same is heavily expanded. In order to be able to utilize this process in the composite material for improving the material properties in an optimal manner, local expansions in the surrounding area of the transformed zirconium crystallites are accommodated by the inventive use of the dispersoid phase.

"Accommodation" in the meaning of the present invention is to be understood as the following mechanism: The dispersoids provided according to the invention result in that under appropriate load acting on the composite material according to the invention, the local expansions or distortions occurring to a certain extent due to the phase transformation of the zirconium oxide are supported, which otherwise would be disabled by a rigid aluminum oxide crystal or zirconium oxide crystal. This is in particular achieved according to the invention in that the dispersoids used according to the invention enable a local shear deformation or inelastic micro-deformation. A requirement for said local micro-deformation and therefore for the accommodation intended according to the invention is the specific property of the dispersoids provided according to the invention. Due to their crystal structure or due to inner interfaces, the dispersoids provided according to the invention, the dispersoid crystals provided according to the invention, show a considerably lower resistance against shear deformation or micro-deformation than the rigid aluminum oxide crystals or zirconium oxide crystals previously used in the prior art.

By accommodating the expansions, the inner stresses and the local distribution of the phase transformation of the zirconium oxide in the composite material according to the invention are advantageously influenced so that actually a higher resistance against crack propagation (so-called fracture toughness) is achieved.

This principle, which is surprisingly effective in the composite material according to the invention, and the properties according to the invention of the composite material have not been described yet in the prior art.

The production of the composite material according to the invention is carried out by means of conventional ceramics technology known per se. The essential process steps are, for example:
a) Preparing the powder mixture according to specified composition in water; if necessary, use of liquefiers to prevent sedimentation.
b) Homogenizing in a dissolver (high-speed stirrer).
c) Milling in an agitator ball mill, thereby increasing the specific surface area of the powder mixture (=comminution).
d) If necessary, adding organic binders.
e) Spray drying, thereby creating free-flowing granulate with defined properties.
f) Wetting the granulate with water.
g) Axial or isostatic pressing.
h) Green machining, thereby substantially mapping the final contour under consideration of the sinter shrinkage.
i) Prefiring, thereby reduction approx. 98% of the theoretical density. The still remaining residual pores are closed toward the outside.
j) Hot isostatic pressing at high temperature and high gas pressure, practically resulting in full final density.
k) So-called clean burn; as a result, the imbalance generated during hot isostatic pressing of the oxygen ions in the ceramic is balanced.
l) Hard machining by grinding and polishing.
m) Annealing.

The composite material according to the invention can be used for example, for producing sintered bodies, for producing components having the ability of absorbing energy under dynamic load in medical technology, for producing orthoses and endoprostheses, for example for hip joint and knee joint implants, drills, for example for medical applications, machine tool components which are tribologically, chemically and/or thermally stressed.

The present invention thus relates to a composite material from aluminum oxide as a ceramic matrix, zirconium oxide dispersed therein, and optionally further aggregates/phases, wherein
the composite material contains as a first phase an aluminum oxide proportion of at least 65% by volume and as a second phase a zirconium proportion of 10 to 35% by volume and, optionally, one or a plurality of inorganic aggregates, and wherein, based on the total zirconium oxide content, the largest portion of the zirconium oxide, preferably 80 to 99% particularly preferred 90 to 99%, is present in the tetragonal phase, and wherein stabilizing the tetragonal phase takes place predominantly not chemically, but mechanically.

Particularly preferred is a composite material according to the invention in which
the zirconium particles have a grain size on average of 0.1 to 0.5 μm, preferably on average of 0.15 to 0.25 μm;
the content of chemical stabilizers relative to the zirconium oxide is limited to values which are significantly lower than the ones for the respective chemical stabilizers used in the prior art;
the content of chemical stabilizers in the composite material according to the invention (proportion in each case relative to the zirconium content) is for $Y_2O_3 \leq 1.5$ mol %, preferred $\leq 1.3$ mol %, for $CeO_2 \leq 3$ mol %, for $MgO \leq 3$ mol % and for $CaO \leq 3$ mol %;
the total content of chemical stabilizers is <0.2 mol %;
the composite material contains no chemical stabilizer;
the aluminum oxide and/or the zirconium oxide contains soluble constituents;
as soluble constituents in the aluminum oxide and/or in the zirconium oxide, one or a plurality of the following elements are present: Cr, Fe, Mg, Ti, Y, Ce, Ca, lanthanides and/or V;
in addition, as a secondary component, a further phase (dispersoid phase) is contained;
in the dispersoid phase, dispersoids are contained which enable inelastic micro-deformations on a microscopic level;
in the dispersoid phase, as dispersoids, platelets are contained which, due to their crystal structure, enable shear deformations on a microscopic level;
the particle sizes of the dispersoids in the dispersoid phase are significantly larger than the grain sizes of the aluminum oxide or the zirconium oxide;
the particle sizes of the dispersoids are preferably 1 to 5 μm;
the volume proportion of the dispersoids forming the dispersoid phase is significantly lower than the proportion of the zirconium oxide;
the volume proportion of the dispersoids forming the dispersoid phase is up to 10% by volume, preferably 2 to 8% by volume, particularly preferred 3 to 6% by volume;
the content of dispersoids forming the dispersoid phase is 2 to 30 millimoles (mmol) per 100 g of total mass;
as dispersoids, substances are used which are chemically stable and which, during the production of the composite material by sintering at high temperature, do not dissolve in aluminum oxide or in zirconium oxide;
as dispersoids, strontium aluminate ($SrAl_{12}O_{19}$) or lanthanum aluminate ($LaAl_{11}O_{18}$) are used;
the fracture strength is >1300 MPa.

Furthermore, the present invention relates to the use of the composite material according to the invention
for producing sintered bodies;
for producing components having the ability of absorbing energy under dynamic load;
in medical technology;
for producing artificial prostheses in the field of medical technology, for example producing orthoses and endoprostheses;
for producing hip joint and knee joint implants.

The invention is explained in the following based on test runs, without limiting the invention thereto:

Test Run 1: Fracture Toughness in Dependence on the Platelet-Forming Agent

FIG. 1 shows the results of a test run with different contents of dispersoids according to the invention. The dispersoid-forming agent in this case is strontium; the amount is indicated in millimoles (mmol) per 100 g of total mass. In each individual case, different ways of processing were tested, for example, different milling times or additional soluble additives. The quantity of the individual tests for each dispersoid content is indicated in FIG. 1 with the number n.

Illustrated is the obtained fracture toughness measured by means of a Vickers indenter (HV 10). The illustration clearly shows that the fracture toughness without dispersoids (=platelet-forming agent zero) is considerably lower than the fracture toughness at higher contents of dispersoids. With this test run, the highest fracture toughness was achieved at a content of 30 mmol/100 g of matrix. However, a noticeable increase of fracture toughness occurred already at very low contents of dispersoid.

Test Run 2: Fracture Toughness in Dependence on the Stabilizer Content

Figure 2:
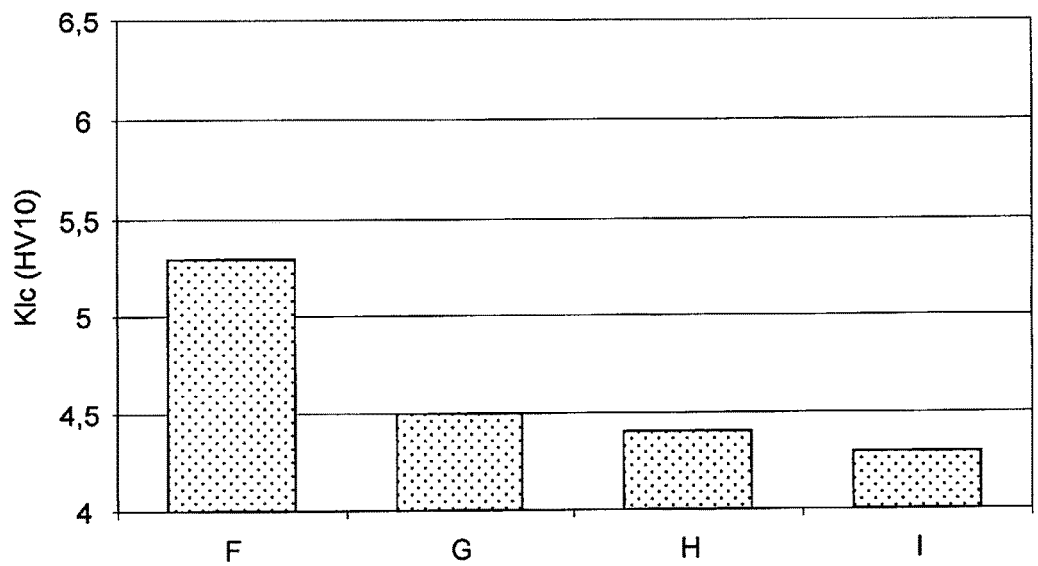
FIG. 2 is a bar graph showing Klc (HV10) for certain examples.

FIG. 2 shows the results of a test run in which an increase of fracture toughness was achieved by reducing the chemical stabilizer. In the figure, the fracture toughnesses of different formulations, indicated in the figure with F-I, are illustrated. The main components $Al_2O_3$ and $ZrO_2$ (21% by weight) are common to all formulations. The formulations differ in type and amount of the chemical stabilizer:

F→no stabilizer, G→1 mol % of $Y_2O_3$, H→5 mol % of $CeO_2$, I→10 mol % of $CeO_2$. The data for the stabilizers are expressed relative to the zirconium content. Ce and Y are known to act as chemical stabilizers for the tetragonal phase of the zirconium oxide. It is clearly shown that any kind of addition of the stabilizer reduces the fracture toughness of the material significantly.

Test Run 3: Variations in Grain Size and Stabilization

Figure 3:
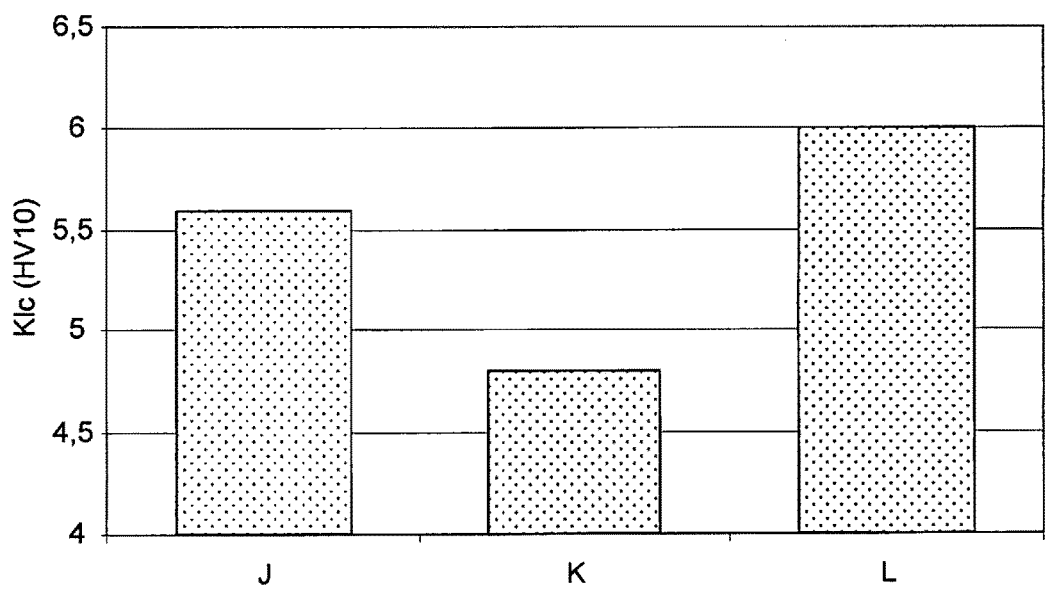
FIG. 3 is another bar graph showing the Klc (HV10) for certain examples.

FIG. 3 shows the results of a test run in which the interaction between chemical stabilization and microstructure was studied. The materials designated with J, K and L in FIG. 3 are characterized as follows:

J=ZTA with 24% by weight of $ZrO_2$, 3% by weight of $SrAl_{12}O_{19}$ and 1.3 mol % of $Y_2O_3$; the grain size of the zirconium oxide is 0.3 μm.

K=J, but with a grain size of the zirconium oxide of 0.2 μm. It is obvious that by decreasing the grain size of zirconium, fracture toughness considerably reduced, synonymous with mechanical overstabilization.

L=J, but with half the $Y_2O_3$ content. The mechanical overstabilization was offset again by the reduced chemical stabilization; through this, the fracture toughness was significantly increased again.

Test Run 4: Strength in Dependence on the Dispersoid Phase

Figure 4:
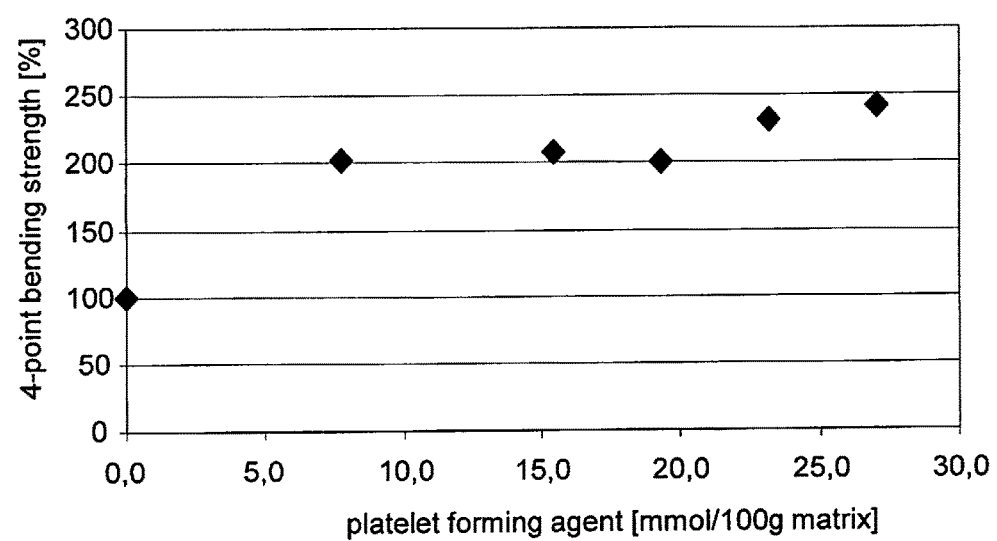
FIG. 4 is a graph of platelet forming agent vs. 4-point being strength.

FIG. 4 shows the results of a test run in which the strength of the composite material according to the invention in dependence on the content of dispersoid phase in the matrix was studied. Adding platelet-forming oxides, in this test run $SrAl_{12}O_{19}$, results in a significant increase of the of the 4-point bending strength. The biggest leap in strength occurs, analog to the fracture toughness, between 0 and 10 mmol/100 q of matrix. A further increase to up to 27 mmol/100 g of matrix results in a further slight increase of strength. By adding the dispersoids according to the invention, strengths up to more than 1300 MPa are achieved, which are strengths which cannot be achieved without dispersoids.

Test Run 5: Effects of Chemical Stabilization on Hydrothermal Aging

Figure 5:
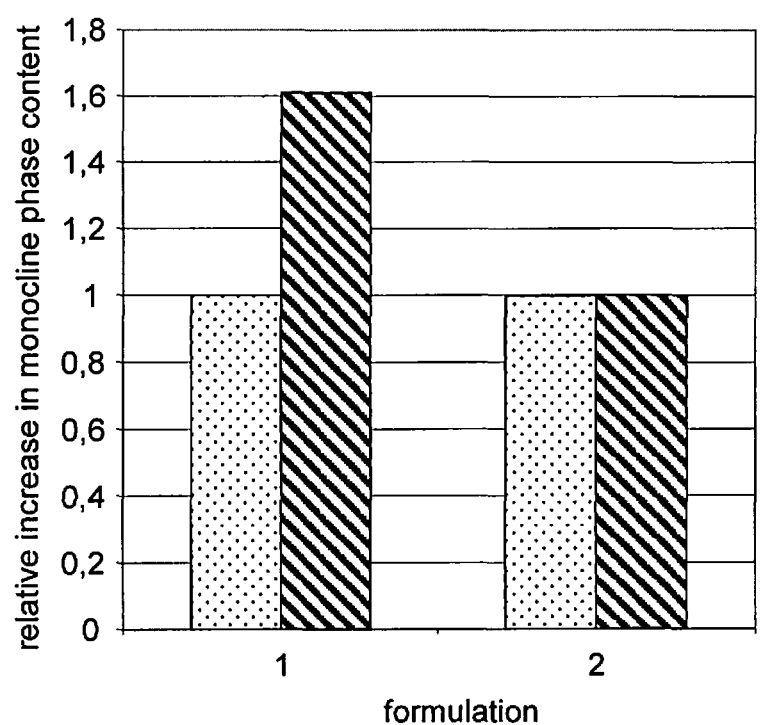
FIG. 5 is a bar graph of the formulation vs. relative increase in monocline phase content.

FIG. 5 shows the results of a test run in which the effects of chemical stabilization on hydrothermal aging were studied.

The figure shows the results of a test on hydrothermal aging (VA=before aging, NA=after aging), thus the increase of the monoclinic phase when exposed to water vapor. According to the draft standard ISO/DIS 6474-2, the following conditions were selected. Water vapor, 0.2 MPa pressure, 134° C., 10 h. The formulations 1 and 2 differ only with regard to the yttrium content.

Formulation 1: 1.3 mol % of yttrium oxide
Formulation 2: 0.0 mol % of ytrrium oxide In the initial state, both grades have a monoclinic content of <10%. For better distinguishability, the monoclinic content in FIG. 5 is scaled.

Formulation 1 shows a relative increase of the monoclinic content of 60%, whereas formulation 2 shows no change in the monoclinic content. Thus, it is proven that the teaching according to the invention, elimination of chemical stabilization, results in significant improvement with regard to the resistance of the composite material according to the invention against hydrothermal aging.

The invention claimed is:

1. A composite material comprising
    at least 65% by volume aluminum oxide as a ceramic matrix;
    from 10 to 35% by volume zirconium oxide particles dispersed in said ceramic matrix; a dispersoid phase in the form of platelets, and
    <0.2 mol % of a chemical stabilizer relative to the zirconium oxide content;
    wherein, based on the total zirconium oxide content, 80 to 99% of said zirconium oxide is present in the tetragonal phase;
    wherein the zirconium oxide particles have an average grain size of from 0.1 to 0.5 μm;
    wherein the chemical stabilizer is selected from the group consisting of $Y_2O_3$, $CeO_2$, CaO and MgO; and
    wherein the platelets of the dispersoid phase enable inelastic micro deformation.

2. The composite material according to claim 1, wherein the zirconium oxide particles have an average grain size of from 0.15 to 0.25 μm.

3. The composite material according to claim 1, further comprising a soluble constituent selected from the group consisting of Cr, Fe, Ti, a lanthanide and V.

4. The composite material according to claim 3, wherein the soluble constituent is an element selected from the group consisting of Cr, Fe and Ti.

5. The composite material according to claim 1, wherein the particle sizes of the dispersoids are 1 to 5 μm.

6. The composite material according to claim 1, wherein the dispersoids comprise a substance which does not dissolve in aluminum oxide or in zirconium oxide when the composite material is sintered.

7. The composite material according to claim 1, wherein the dispersoids are selected from the group consisting of strontium aluminate and lanthanum aluminate.

8. The composite material according to claim 1, wherein the fracture strength is >1300 MPa.

9. A sintered body comprising the composite material according to claim 1.

10. A component comprising the composite material according to claim 1, wherein the composite absorbs energy under dynamic load.

11. The component of claim 10 which is a medical device.

12. An artificial prosthesis comprising the composite material of claim 1.

13. The artificial prosthesis of claim 12, which is a hip joint implant or a knee joint implant.

* * * * *